Nov. 26, 1935.  W. R. GRISWOLD  2,022,034

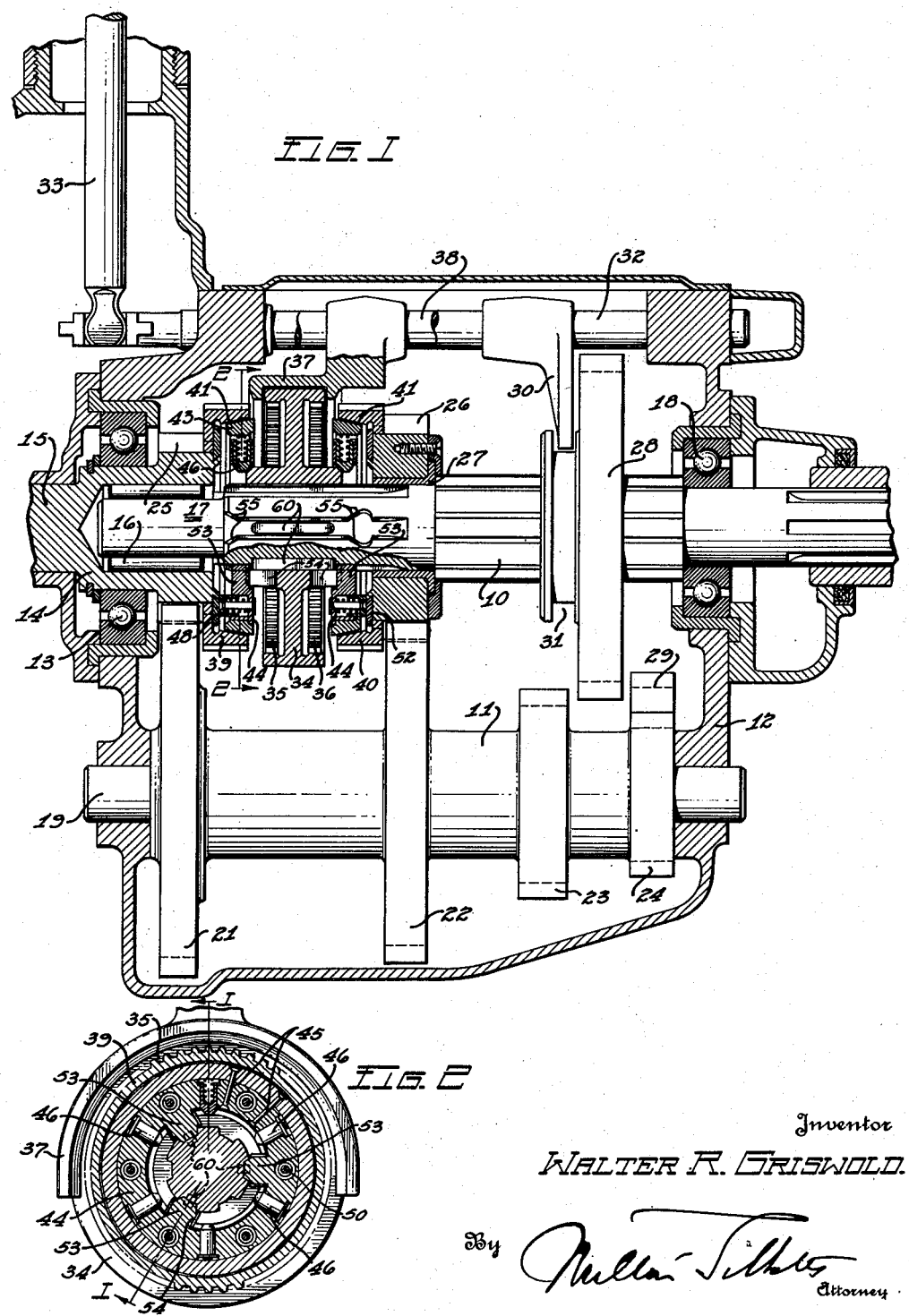

TRANSMISSION MECHANISM

Filed March 3, 1932   2 Sheets-Sheet 2

Inventor
WALTER R. GRISWOLD.

By
Attorney

Patented Nov. 26, 1935

2,022,034

UNITED STATES PATENT OFFICE 2,022,034

TRANSMISSION MECHANISM

Walter R. Griswold, Detroit, Mich., assignor to Packard Motor Car Company, Detroit, Mich., a corporation of Michigan Application March 3, 1932, Serial No. 596,496

8 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of the vehicle operation may dictate, so that gear changing has come to be considered as perhaps the most difficult task incident to the operation of a motor vehicle.

To assist the operator in making rapid and quiet shifts, it has been previously proposed to synchronize the gears to be meshed by various means, such as friction clutches. Such devices, however, have been open to certain objections. The mechanisms employed have been, in general, cumbersome and complicated. Frequently the friction elements have not been applied with sufficient pressure to effect proper synchronization within the very short time interval available for this purpose, or if so applied, the operating mechanism has been subjected to excessive wear. This has made it necessary to release the synchronizing means immediately upon engagement of the gears, which in turn requires delicate and complicated means to determine the exact time of application and of release.

One of the objects of this invention is to provide a motor vehicle transmission having an improved form of synchronizing device which is efficient, simple and effective.

Another object of the invention is to provide a transmission mechanism in which the engagement pressure of friction elements shall be considerably augmented to bring the positive clutch elements quickly to synchronized speed and in which the friction elements are automatically disengaged prior to positive clutch engagement.

Other objects of the invention will appear from the following description taken in connection with the drawings, which form a part of this specification, and in which:

Fig. 1 is a view partially in side elevation and partly in vertical section through a motor vehicle transmission constructed in accordance with the invention taken on line 1—1 of Fig. 2;

Fig. 2 is a view in section taken substantially on line 2—2 of Fig. 1;

Figure 3:
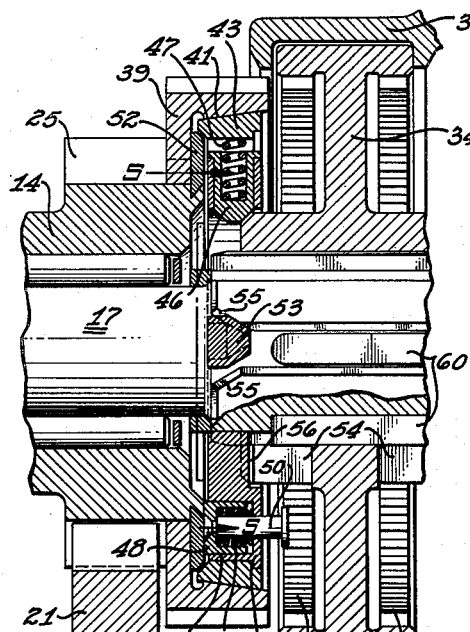
Fig. 3 is a view similar to Fig. 1 showing a fragment of the transmission with the shifter member shifted part way toward engagement with the drive shaft.
Figure 5:
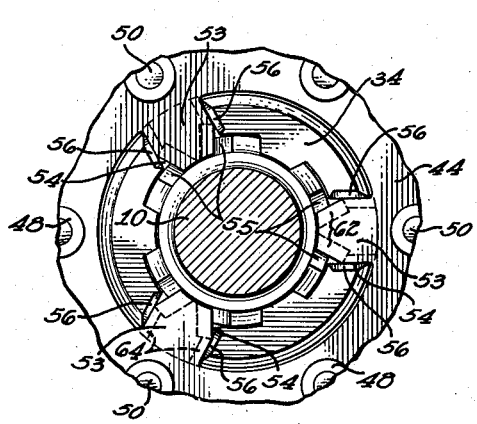
Fig. 5 is a sectional view of the transmission taken substantially on line 5—5 of Fig. 3.
Figure 6:
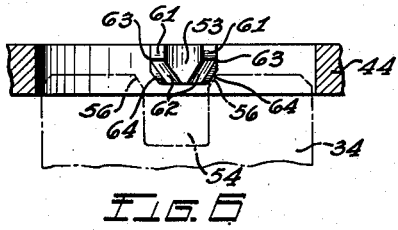
Fig. 6 is a fragmentary plan view of one of the friction synchronizer members and Fig. 7 is a perspective view of the same.

Referring to the drawings, in Fig. 1 is shown a motor vehicle transmission comprising a splined transmission shaft 10 and a countershaft or gear spool 11, mounted in a housing or transmission case 12. The front wall of the housing carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19, supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from the clutch shaft 15 in the well known manner. The gear 22 is also continuously in mesh with a gear 26 which is mounted for rotation on a bearing sleeve 27, pressed or otherwise rigidly mounted on the shaft 10, as will be readily understood.

Gears 23 and 24 constitute the low speed and reverse gears respectively, and are adapted to drive the gear 28 which is splined to and slidable on the shaft 10, this gear 28 being directly engageable with the gear 23. It may be driven from the gear 24 through a reverse idler pinion 29 in the well known manner. Such sliding action is effected in the usual way by means of a shifter fork 30, which engages in a groove 31 in the body of the gear 28, this fork being actuated by a shifter rod 32 slidably mounted in suitable bearings in the upper part of the cover portion of the casing 12. The shifter rod 32 is selectively actuated by a lever 33, of usual form, which may be manually operated by the vehicle driver in the well known manner. Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is associated with the shaft between the gears 25 and 26.

In such device there is a positive clutch element 34 having a hub portion, which is splined to slidably engage the splined end of the shaft 10, and a rim portion having internal teeth 35 and 36 formed thereon. This clutch element is shiftable axially on the driven shaft by means of a yoke 37 which is fixed to the shaft 38 which is actuated by the shift lever 33 in the usual manner. The clutch member 39 is fixed to the rear end of the enlarged portion 14 of the drive shaft 15 and a similar clutch member 40 is fixed upon the forward end of the gear 26, such toothed clutch members 39 and 40 being arranged so that the teeth 35 can mesh with the teeth on member 39 when the positive clutch element is moved forwardly and so that the teeth 36 can mesh with the teeth on the clutch member 40 when the positive clutch element is moved rearwardly. When the teeth 35 mesh with the clutch member 39, a direct drive will be established between the drive shaft 15 and the driven shaft 10, and when the teeth 36 mesh with the clutch member 40, power is transmitted from the shaft 15 to the shaft 10 through gears 21, 22, 26 and the positive clutch element, such arrangement providing a reduction drive.

In order that the members forming the positive clutch connection will not clash when being moved into engaging relation, I provide synchronizing means which is actuated through movement of the positive clutch element and in advance of its meshing relation, such synchronizing means being so formed and related that positive synchronization results under all circumstances.

To this end, I provide each of the members 39 and 40 with an interior conical surface 41 and arranged complementary to each of such cone surfaces is a friction clutch ring 43. Within each of the friction rings is a hub member 44, secured thereto by suitable means such as rivets 45, see Fig. 2. These hubs are provided with a plurality of radially extending openings in which plungers 46 are mounted so that they can have a limited reciprocable movement. The plungers are flanged at their outer ends in order to limit their reciprocation and to prevent their radial displacement inwardly of the bore of the hubs, and a coil spring 47 engages each of the plungers and the associated friction ring. Such springs are formed to exert considerable pressure and normally maintain the plungers in a projected relation toward the axis of the hubs so that they extend in a plane where they must be moved by the hub of the positive clutch member in order for it to be shifted from a neutral position in either direction.

The hub members 44 are also provided with axially extending plungers 48 which are reciprocably mounted in recesses 49 arranged intermediate the radial plungers 46. Such axially extending plungers have guide members 50 secured thereto which project through adjacent walls of the hub members and terminate in heads which limit the piston movement and prevent displacement of the pistons from the hubs. Coil springs 51 are associated with the hubs and normally exert pressure against the pistons so that they extend beyond the ends of the hubs in a relation such that they will engage with ring friction members 52 fixed to the enlarged end of the drive shaft 15 and to the forward end of the gear 26.

The hubs 44 are provided with three spaced tongues 53 which extend radially into the bore portion thereof a sufficient distance to engage in the splines formed in the forward end of the driven shaft 10. The ends of the hub portion of the positive clutch element are formed with three slots 54 which align with splines in the driven shaft so that when the positive clutch element is shifted to engage the members 39 and 40, the tongues 53 will ride in the slots. The splines in the driven shaft into which the tongues 53 are adapted to enter are flared through means of angularly disposed walls 55, and the adjacent ends 56 of the slots in the hub of the positive clutch element are likewise flared outwardly.

In each of the splines of the driven shaft which align with the slots in the positive clutch hub I provide radially extending abutments 60, the ends of which are arranged to limit the movement of the tongues 53 in a direction toward the center of the positive clutch element.

The tongues 53 are formed with axially extending angular faces 61 which terminate at one end in a chamfered portion 62 beveled radially and axially of the hub, while the base portion 63 of the side walls of the tongues are formed to extend in parallel relation with their ends 64 beveled to extend at an angle toward each other axially of the hub. The beveled faces 62 and the faces 61 are adapted to engage with the walls forming the splines in the driven shaft in which the abutments 60 are located, while the faces 63 and 64 are formed to associate with the walls forming the slots in the positive clutch hub. The teeth on the two hub members are similar except that their beveled end faces are in reverse relation, that is with their beveled ends pointed toward the center of the positive clutch element.

With the positive clutch element in the position shown in Fig. 1, there will be no connection formed thereby between the shafts 10 and 15, that is, the mechanism is in a neutral position. When it is desired to connect the shaft 10 directly with the shaft 15, the positive clutch element 34 is shifted forwardly, that is to the left, and such movement will push the forward hub 44 toward the shaft 15 due to the engagement of the positive clutch hub with the projecting spring pressed plungers 46 so that in this manner the forward clutch ring 43 will be moved axially into frictional engagement with the cone face 41 of the member 39. The springs 47 exert pressure against the plungers which will only be overcome after synchronization of the positive clutch element has been had with the driving shaft. As the positive clutch element is moved forwardly, the compression of the coil springs 51 is increased which, through the contact of the plungers 48 with the friction ring 52, tends to synchronize the associated hub 44 and the driving shaft. As the positive clutch element is shifted forward, the chamfered faces 62 of the hub tongues will engage against one of the chamfered faces 55 and such association will provide a servo action which tends to more quickly bring the shaft 10 into synchronized relation with the shaft 15 through means of the friction ring 43. This servo action takes place mainly because the shaft 10 rotates relative to the hub and friction ring device. When the clutch mechanism has been moved to the position shown in Fig. 3, the friction ring and its associated hub have reached substantially the limit of their forward movement, and further forward axial movement of the positive clutch element will be stopped until the shaft 10 rotates at the same speed as the tongues 53 which are held in frictional engagement with the shaft 10 through the axial pressure against the friction ring 43. When in position shown in Fig. 3, the chamfered faces 64 extend into the chamfered ends of the slots 54 which later serve to guide the tongues into such slots after synchronization has taken place and upon a continuation of the forward movement of the positive clutch element 34. The chamfered faces 62, in addition to providing a servo action, will also positively prevent a forward axial movement of the positive clutch element beyond substantially the position shown in Fig. 3 until the shaft 10 is synchronized with the shaft 15 and therefore the clutch element 35 can never clash with the teeth of the member 39 when shifted into meshing relation therewith.

Figure 4:
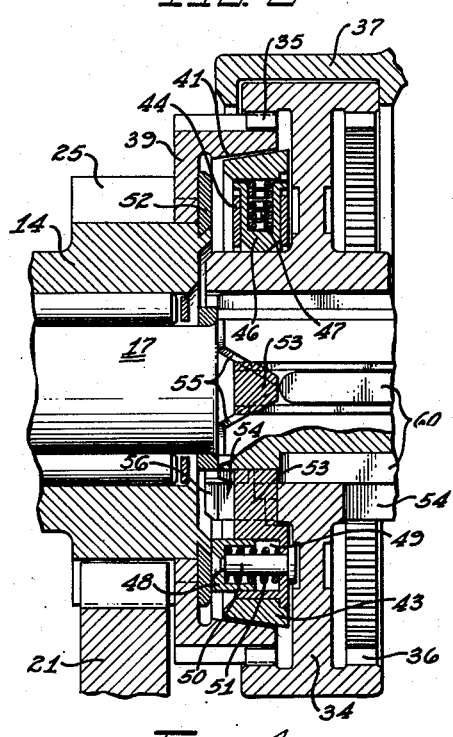
Fig. 4 is a similar view with the shifter member completely moved into clutch relation to form a direct drive from the drive shaft to the driven shaft.
Figure 7:
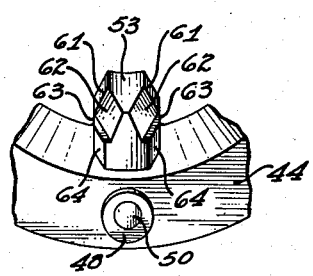

After synchronization takes place, the positive clutch element can be shifted further forward and will press the plungers 46 outwardly whereupon the clutch element 35 is moved to engage the member 39. However, just previous to this clutch engagement, the hub 44 and the friction ring member carried thereby will be moved rearwardly out of engagement with the friction face of the member 39, as shown in Fig. 4, due to the uncoiling of springs 51 which is permitted by the radial movement of the plungers 46 as they pass into a position outwardly of the periphery of the hub of the positive clutch element. In this manner, the synchronizing device will be disengaged just prior to engagement of the positive clutch elements, but if the teeth of the positive clutch are not in meshing relation, then the shifting pressure against the positive clutch element will quickly move them into mesh upon slight rotation of the driving gear. As the positive clutch element is moved out of clutched relation, the hub 44 will be moved to a position where the plungers 46 can return to their projecting position and thus maintain the positive clutch element in a neutral position.

It will be understood that the synchronizing device to be associated with the members 36 and 40 is similar in construction and function to the synchronizing device which is described and, therefore, a further explanation of the operation of this synchronizing device is not thought to be necessary.

The mechanism herein described will positively synchronize the driving and driven shafts prior to engagement of the positive clutch and therefore there can be no clashing of positive clutch teeth with any manner of shifting operation for obtaining high and second high driving speeds, and this result can be obtained without any undue hesitation in the clutch shifting movement and without reaction on the shifting lever.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a transmission mechanism having a driving member and a splined driven member, a clutch element in driving relation with the driven member and axially movable thereon to connect the members in driving relation, said clutch element having a hub portion with slots therein arranged to register with splines in the driven member, synchronizing mechanism including a shiftable friction ring engageable with the driving member, a hub fixed to the ring and axially movable intermediate the positive clutch element and the driving member, plungers carried by the hub and arranged to be engaged by the positive clutch hub when moved toward engaging relation, and tongue means extending from the friction ring hub and engageable in the registering slots in the positive clutch hub and the splines in the driven member.

2. In a transmission mechanism having a driving member and a splined driven member, a clutch element in driving relation with the driven member and axially movable to connect the members in driving relation, synchronizing mechanism including a shiftable friction ring engageable with the driving member, a hub fixed to the ring and axially movable intermediate the positive clutch element and the driving member, means on the friction ring hub member for engaging the driven member and the clutch element, said means engaging with the driven member and positively synchronizing the same with the driving member prior to positive engagement of the clutch element with the driving member, and means carried by the friction ring hub and engaging the driving member for automatically releasing the friction ring from the driving member prior to engagement of the positive clutch element with the driving member and prior to engagement of said hub means with the positive clutch element.

3. In a transmission mechanism having a driving member and a splined driven member, a clutch element in driving relation with the driven member and axially movable to connect the members in driving relation, said element having a hub portion with slots therein registering with splines in the driven member, synchronizing mechanism including a shiftable friction ring and a hub fixed to the ring, said mechanism being axially movable intermediate the positive clutch element and the driving member, spring pressed means carried by the synchronizing mechanism and engaging the driving member for automatically releasing the synchronizing mechanism prior to engagement of the positive clutch element with the driving member, and stop means on the driven member for limiting the movement of the synchronizing mechanism after release.

4. In a transmission mechanism, a driving member, a driven member having splines therein extending in an axial direction and with the ends thereof flared, a clutch element in driving relation with the driven member and axially movable to connect the members in driving relation, said clutching element having a hub portion with slots therein registering axially with the splines in the driven member, the ends of the slots being flared, and synchronizing mechanism including a shiftable friction ring engageable with the driving member, a hub fixed to the ring and axially movable intermediate the positive clutch element and the driving member, means on the hub with which the positive clutch element engages while being shifted to move the synchronizing mechanism in advance thereof, and tongues extending from the hub and engageable in the registering slots in the positive clutch hub and the splines in the driven member, said tongues having a set of beveled faces at one end engageable in driving relation with the flared splined walls to synchronize the driven member with the driving member prior to engagement of the postive clutch element with the driving member and with another set of beveled faces for engaging the flared walls at the end of the slots in the clutch hub for guiding the tongue means into the associated slots.

5. In a transmission mechanism having a driving member and a splined driven member, a clutch element in driving relation with the driven member and axially movable to connect the members in driving relation, said element having a hub portion with slots therein registering with the splines in the driven member, synchronizing mechanism including a shiftable friction ring and a hub fixed to the ring, said hub being splined to said driven member and axially movable intermediate the positive clutch element and the driving member, means for automatically releasing the synchronizing mechanism from the driving member prior to engagement of the positive clutch element with the driving member, and stop means for limiting the movement of the synchronizing mechanism after its release.

6. In a transmission mechanism having a driving member and a driven member, a clutch element fixed to the driving element having exterior teeth and an inner friction surface, a clutch element slidably keyed on said driven member and having internal teeth engageable with the teeth on the fixed clutch element, and synchronizing means including a friction element engageable with the friction surface of the fixed clutch element, a hub splined on the driven member and fixed to the friction element, and spring pressed plungers carried by and extending radially from the hub into the path of movement of the shiftable clutch element, said radial plungers being engaged by the shiftable clutch element when moved toward clutching relation thereby moving the friction clutch element into engagement with the friction surface of the fixed clutch element prior to engagement of the teeth on the shiftable clutch element with the teeth on the fixed clutch element.

7. In a transmission mechanism having a driving member, a clutch element fixed to the driving member, said clutch element having exterior teeth and an interior friction surface, a splined driven member, an axially movable positive clutch element fixed to rotate with the splined driven member, a friction ring adapted to be engaged with the friction surface of the fixed clutch element, a hub fixed to the ring, said ring and hub being arranged intermediate the shiftable clutch element and the fixed clutch element, a driving connection between said hub and said driven member, spring pressed plunger means carried by the hub and engageable by the shiftable clutch element to move the friction ring axially into engagement with the interior friction surface of the fixed clutch element, and spring pressed plunger means carried by the hub for engaging the driving member to disengage the friction ring from the friction surface prior to engagement of the teeth on the shiftable and fixed clutch elements.

8. In a transmission mechanism having a driving member, a driven member, a clutch element fixed on the driving member having exterior teeth and an interior friction surface, a positive clutch element splined to the driven member and having internal teeth adapted to engage with the teeth on the fixed clutch element when moved axially, a hub intermediate the fixed and movable positive clutch elements, a friction ring surrounding said hub and fixed thereto, radially extending spring pressed plungers carried by and projecting from the hub and engageable by the slidable positive clutch element to move the friction ring into engagement with the friction surface on the fixed clutch element when the positive clutch element is moved axially, spring pressed plungers extending axially of and carried by said hub and engageable with the driving member to disengage the friction ring from the friction surface prior to engagement of the teeth on the slidable and fixed clutch elements, and tongues fixed to and extending radially from the hub and projecting into the splines of the driven member.

WALTER R. GRISWOLD.